United States Patent [19]

Rose

[11] Patent Number: 5,144,660
[45] Date of Patent: Sep. 1, 1992

[54] SECURING A COMPUTER AGAINST UNDESIRED WRITE OPERATIONS TO OR READ OPERATIONS FROM A MASS STORAGE DEVICE

[76] Inventor: Anthony M. Rose, 66 Drumalbyn Road, Bellevue Hill, Sydney, Australia, 2023

[21] Appl. No.: 401,032

[22] Filed: Aug. 31, 1989

[30] Foreign Application Priority Data

Aug. 31, 1988 [ZA] South Africa ................. 88/6480

[51] Int. Cl.$^5$ .................................................. H04L 9/00
[52] U.S. Cl. ........................................... 380/4; 380/25
[58] Field of Search .................................. 380/3, 4, 25

[56] References Cited

U.S. PATENT DOCUMENTS

| | | | |
|---|---|---|---|
| 4,926,476 | 5/1990 | Covey | 380/4 |
| 4,947,318 | 8/1990 | Mineo | 380/4 |
| 4,962,533 | 10/1990 | Krueger et al. | 380/4 |
| 4,984,272 | 1/1991 | McIlroy | 380/25 |

FOREIGN PATENT DOCUMENTS

| | | |
|---|---|---|
| 1089157 | 3/1967 | United Kingdom . |
| 1282628 | 7/1972 | United Kingdom . |
| 2172721 | 9/1986 | United Kingdom . |
| 2181281 | 4/1987 | United Kingdom . |

*Primary Examiner*—Thomas H. Tarcza
*Assistant Examiner*—David Cain
*Attorney, Agent, or Firm*—Ladas & Parry

[57] ABSTRACT

A method of protecting a computer against "trojan" or "virus" programs is disclosed. A device 24 is connected in the bus between the disk controller card 16 and the disk drive 14 of the computer. The device monitors the bus and alerts the user when any illegitimate write attempts to a protected area of the disk is detected.

8 Claims, 5 Drawing Sheets

SECURING A COMPUTER AGAINST UNDESIRED WRITE OPERATIONS TO OR READ OPERATIONS FROM A MASS STORAGE DEVICE

FIELD OF THE INVENTION

This invention relates to a method of securing a computer against undesired write operations to, or read operations from, a mass storage device of the computer, and to a device for use in the method.

BACKGROUND OF THE INVENTION

The invention finds particular application in securing a computer against corruption of data on its mass storage device by malicious programs such as so-called "trojan" or "virus" programs.

Most personal computers are equipped with one or more hard disk drives. These typically store between ten and several hundred megabytes of information, and are the computer's prime, and often only, large-scale permanent program and data store. As such, they are prime targets for attack by malicious programs.

There has recently been a dramatic rise in the incidence of "trojan" or "virus" programs. These are programs designed to destroy data on a computer system by erasing or modifying data stored on the computer's disk drives. They are often embedded in otherwise legitimate and useful programs. These programs are usually acquired by a computer user by copying public domain or shareware programs, or are intentionally placed on a host computer by someone wanting to destroy data on that system.

Virus programs may lie dormant for some time before being triggered, e.g. after a certain number of accesses, after a certain time, on a given date, or on some other trigger event. During the time that the virus is dormant it may attempt to reproduce itself on other disks or disk drives, thereby spreading itself further. The viruses on these copies will also remain dormant and not reproduce until triggered.

When the virus is triggered, it attempts to interfere with the computer's operation. One way it does this is to destroy data stored in the computer's disk drive memory. There are many ways of doing this, ranging from erasing or modifying individual files, erasing or modifying the disk's directory to prevent the computer from locating files, or completely erasing (re-formatting) the computer's disk drive.

It is an object of the present invention to secure a computer against undesired write operations to, or read operations from, a mass storage device of the computer.

SUMMARY OF THE INVENTION

According to the invention there is provided, in a computer having a mass storage device, control means for controlling write operations to, or read operations from, the mass storage device, and a bus connecting the control means to the mass storage device:

a method of securing the computer against undesired write operations to, or read operations from, the mass storage device which method comprises, in logic circuitry connected to the bus between the control means and the mass storage device, decoding control signals between the control means and the mass storage device and, in response to such decoding, controlling write operations to and/or read operations from the mass storage device.

Where the mass storage device is a disk drive having a plurality of tracks and one or more heads which are advanced from one track to the next by step signals from the control means to the disk drive, the method may comprise counting the step signals in a counter connected to the logic circuitry in such a manner that the counter keeps track of the track selected.

Said controlling may include disabling write operations to the disk drive when the counter has reached a predetermined count.

The invention extends to a device for use in the above method the device comprising:

logic circuitry connectable to the bus between the control means and the mass storage device; and means operable in response to the logic circuitry for controlling write operations to and/or read operation from the mass storage device.

BRIEF DESCRIPTION OF THE DRAWINGS:

The invention will now be described in more detail, by way of example, with reference to the accompanying drawings.

In the drawings.

Figure 1:
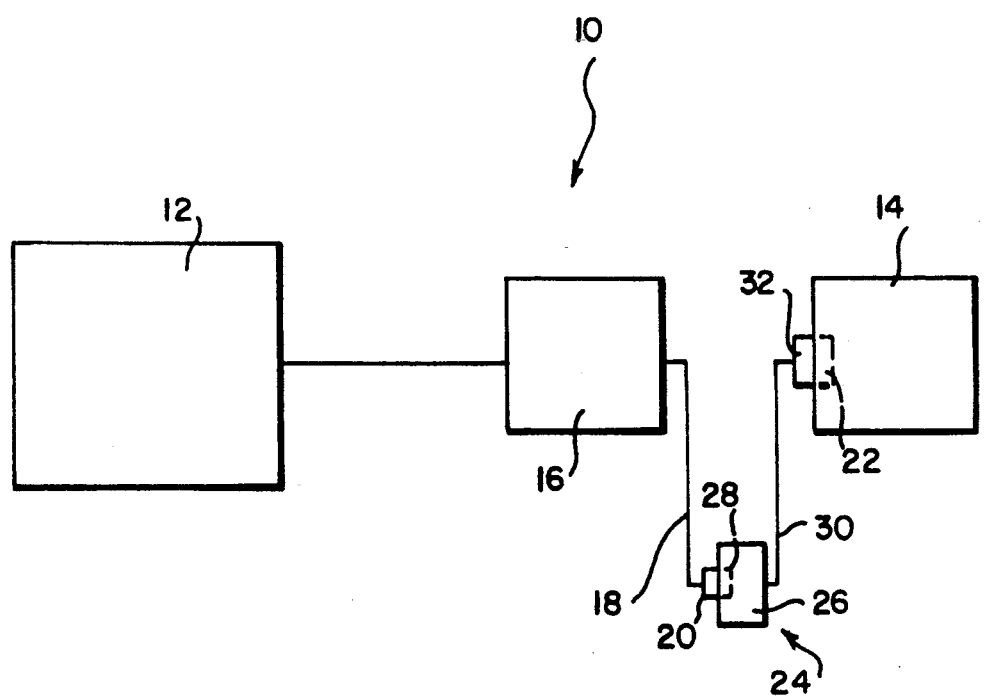
FIG. 1 is a simplified block diagram of a computer which has a device in accordance with the invention fitted thereto.

DETAILED DESCRIPTION OF PREFERRED EMBODIMENT:

Referring first to FIG. 1, a computer which is generally designated 10 comprises a central processing unit 12, a hard disk drive 14, and a disk controller card 16. Normally, the controller card 16 is connected to the disk drive 14 via a cable 18 having a female connector 20, the female connector being plugged into a male connector 22 on the disk drive.

In accordance with the invention, a device 24 is interposed between the controller card 16 and the disk drive 14. The device 24 comprises a circuit board 26, a male connector 28 on the circuit board, and a cable 30 with a female connector 32. The male connector 28 is identical to the male connector 22, and the female connector 32 is identical to the female connector 20. Installation of the device 24 takes place by unplugging the female connector 20 from the male connector 22 of the disk drive and plugging it into the male connector 28 of the device 24, and plugging the female connector 32 of the device into the male connector 22. No soldering is required to effect installation.

Figure 2A:
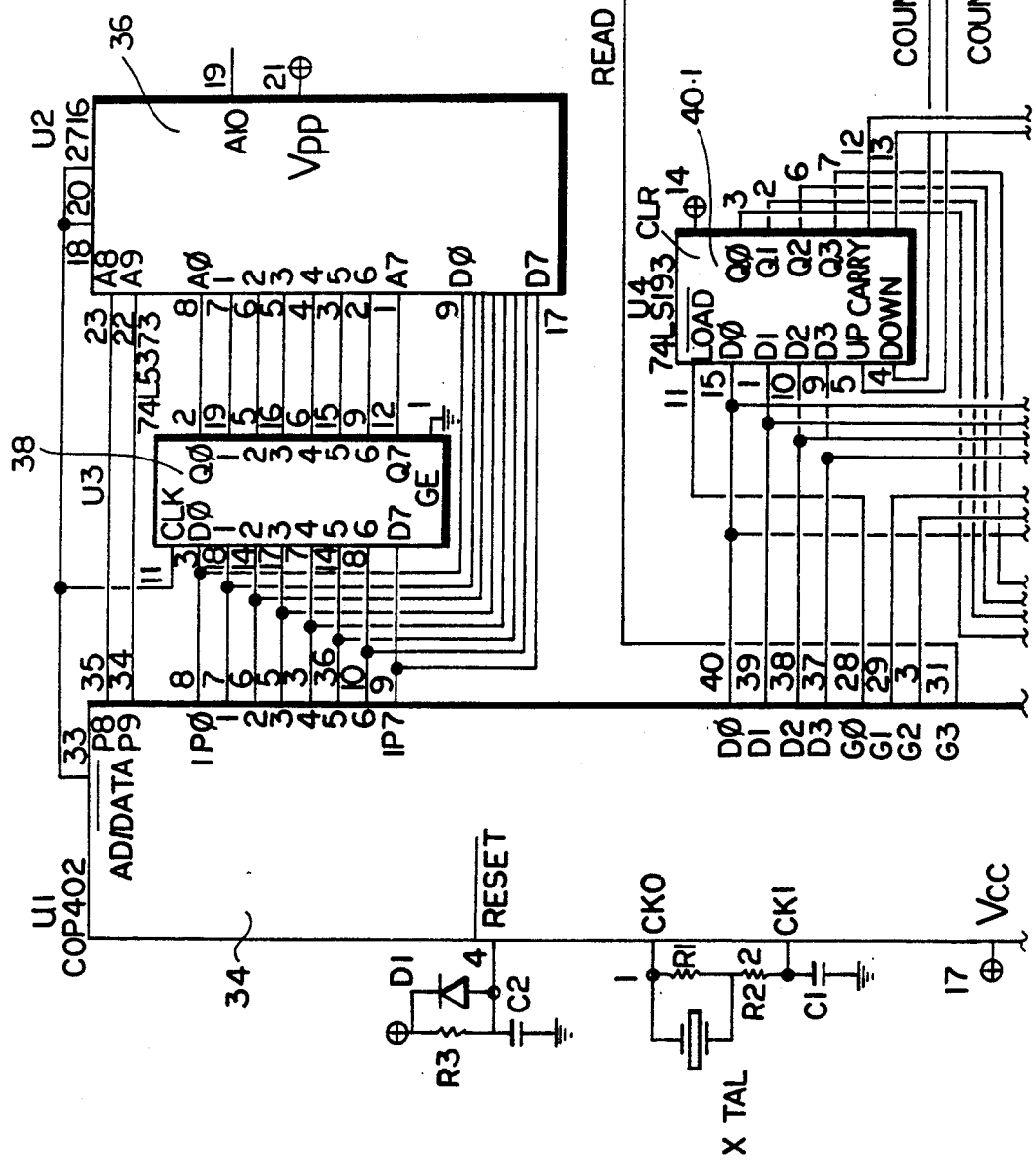
FIGS. 2a–2b and 3a–3b illustrate the circuitry of the device.
Figure 2B:
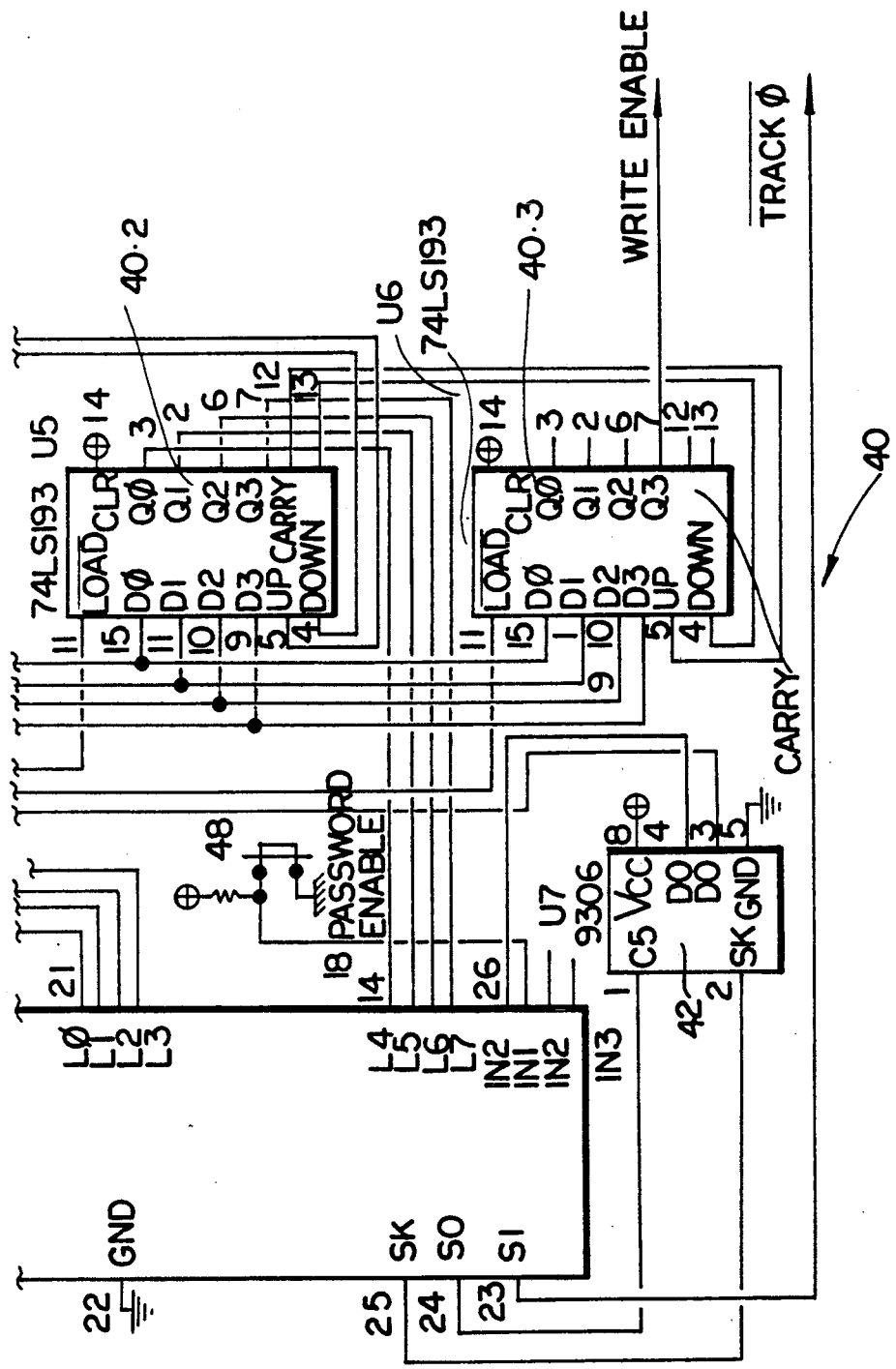
Figure 3A:
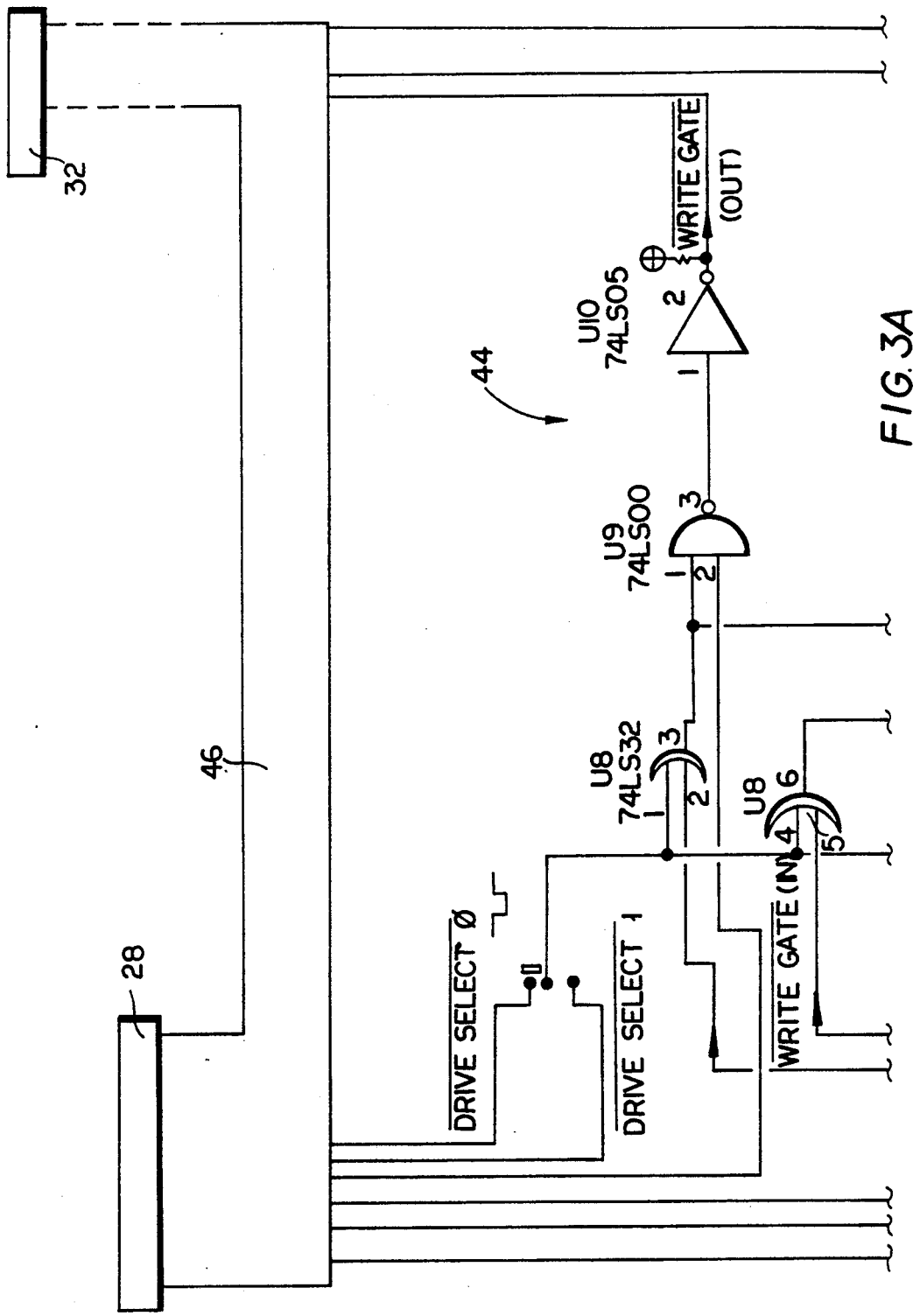
Figure 3B:
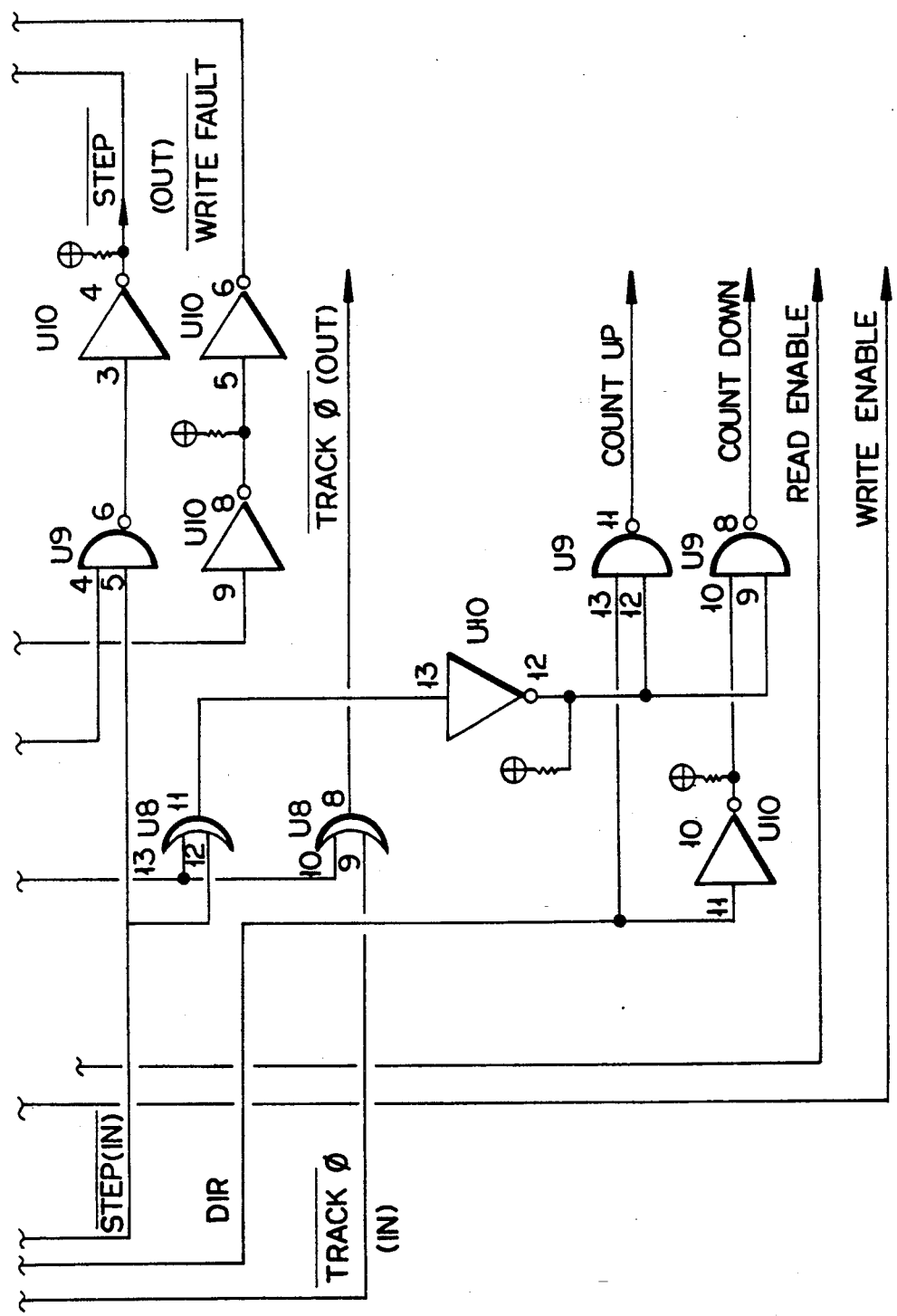

Referring now to FIGS. 2 and 3, the circuitry of the device 24 comprises a microprocessor 34, a non-volatile program memory in the form of an EPROM 36, a latch interface 38 between EPROM 36 and the microprocessor 34, an up/down counter 40 made up of three counters 40.1, 40.2, and 40.3, an electrically erasable non-volatile memory in the form of an EEPROM 42, and logic circuitry which is generally designated 44 in FIG. 3. The circuitry further comprises a bus 46, the male connector 28 and the cable 30 being connected at opposite ends to the bus. The logic circuitry 44 is connected to individual lines of the bus 40 and to tho circuitry of FIG. 2 as illustrated in the drawings and as will be described in more detail hereinafter.

The device is able to operate in various modes providing different levels of protection. Thus, there may be a write protection mode and a read protection mode.

The device is supplied with software that allows the user to select one of the operating modes. A password facility is also provided. Once the device has been installed, the supplied software will be used whenever the user wishes to change the operating mode.

The password is stored internally, in the EEPROM 42. The device is supplied with a standard default password. After installation, the user would user would use the supplied software to enter his own password, which then becomes stored in the EEPROM 42, so that the password is retained even when the computer is powered down. The password can be changed at any time by entering the existing password followed by a new one.

Any change from one operating mode to another requires the entry of the user's password. Since the password is never stored within the computer (it is only retained in a non-readable form within the device 24), it is impossible for any program of the computer to search for and use a password resident in the computer's memory. The unit is designed such that a program which continuously attempts to "guess" the password would take impractically long to "guess" the correct password.

The device is provided with a wire jumper 48 which, if closed by means of a plug that is supplied, will re-set the password to its default setting the next time the computer is turned on. This will enable the user to enter a new password should the previous one have been forgotten. Since resetting of the password requires physical access to the device, unauthorised software reset of the password by a malicious program is not possible.

For further protection, the supplied software can be used to program the unit never to reset the password. If a user feels confident that the password will not be forgotten, or the user uses the unit in an environment where others may have access to it, then enabling this option prevents the password from ever being reset, even if the wire jumper is used.

It is to be noted that the password is only stored within the device 24, and not within the computer's memory. Furthermore, the password is stored in such a manner that it is not possible to read it out of the device. Therefore, errant programs have no access to this information and it does not compromise the security offered by the device.

The logic circuitry 44 comprises a drive select switch 50 whereby either the DRIVE SELECT 0 or DRIVE SELECT 1 lines of the bus 46 can be selected. It further comprises four OR gates 52.1, 52.2, 52.3 and 52.4, four AND gates 54.1, 54.2, 54.3 and 54.4, and inverters 56.1, 56.2, 56.3, 56.4, 56.5, and 56.6.

The TRACK 0 line of the bus 46 is connected via the OR gate 52.4 to a general purpose data input pin of the microprocessor 34. The DIR line of the bus 46 is connected via the inverter 56.6 and the AND gates 54.3 and 54.4 to COUNT UP and COUNT DOWN lines which lead to the up/down counter 40.

The STEP (IN) line of the bus 46 is connected via the AND gate 54.2 and the inverter 56.2 to the STEP (OUT) line of the bus 46. It is further connected via the OR gate 52.3 and the inverter 56.5 to the AND gates 54.3 and 54.4.

The WRITE GATE (IN) line of the bus 46 is connected via the AND gate 54.1 and the inverter 56.1 to the WRITE GATE (OUT) line of the bus 46.

A READ ENABLE line is connected from a general purpose latched data output pin of the microprocessor 34 via the OR gate 52.2 to the AND gate 54.2.

A WRITE ENABLE line is connected from the Q3 pin of the counter 40.3 to the OR gate 52.1.

The output of the OR gate 52.1 is connected via the inverters 56.3 and 56.4 to the WRITE FAULT line coming from the controller 16, and is OR-tied with the WRITE FAULT line coming from the disk drive 14. This line can be asserted when a write to a protected area of the disk is detected. The computer is thus informed of an illegitimate write attempt and will alert the user that an error has occurred. This feature can be enabled or disabled under the control of the microprocessor.

Write Protection

The device can be set to protect any sized contiguous block of the disk, either starting at the beginning of the disk or terminating at the end of the disk. Disks with up to 2000 tracks or cylinders (more than any microcomputer drives currently available) are catered for. If desired, the entire disk can be protected from beginning to end.

As an example, assume the user has a 40 megabyte hard drive, which is logically split (using the program supplied with the computer) into two 20 megabyte drives, called C: and D: Assuming that the drive has 6 heads, there will then be a total of 816 cylinders on the disk. Drive C: will then occupy cylinders 0 to 407 and drive D: will occupy cylinders 408 to 815.

If the user wishes to try out a suspect item of software, one way to do so would be to reserve logical drive D: (cylinders 408 to 815) as a test section of the disk, and put all essential data and applications on the drive C: part of the disk (cylinders 0 to 407).

Therefore, in this example, before running the would ensure that even if the software were malicious and tried to write to or even format the disk, the drive C: section would be completely protected from any type of modification.

The circuitry of FIGS. 2 and 3 will continuously monitor the bus 46 from the controller card 16 to the disk 14 and, by means of the up/down counter 40 keep track of the track selected on the disk. Should an attempt be made to write to a track within the designated write-protected area on the disk, the write attempt is disabled by removal of the write-enable signal to the disk drive, and the computer user is alerted to the attempted violation.

The operation will now be described in more detail with reference to the logic circuitry 44, this comprising the discrete logic necessary to decode the disk drive selection and control signals for use by the device, and to allow the microprocessor in the drive to read these signals and act accordingly.

DRIVE SELECT 0 and DRIVE SELECT 1 are control lines from the host computer and signify which disk drive (if there are more than one) is active. The switch 50 selects which disk drive to use by connecting the appropriate selection line to the rest of the decode circuitry.

Gates 52.1, 54.1 and 56.1 provide the write gate selection to the disk drive 14. The WRITE GATE OUT line is connected to the disk drive's WRITE GATE input. When this input goes active, then the disk drive can be written to. Therefore the purpose of gates 52.1, 54.1 and 56.1 is to hold off this signal to prevent the disk from being written to, by means of the WRITE ENABLE signal provided by the high-order bit of counter 40.3. When this WRITE ENABLE signal is high, writing to the disk drive is prevented.

The counter 40 counts the step pulses going to the disk drive. These pulses are provided by the disk drive controller 16 of the host computer and cause the disk drive head to advance to the appropriate cylinder. The device counts these pulses and enables or disables writing to the disk drive depending on the position of the heads. This makes it possible for the user to write-protect any contiguous area of the disk.

The count on the counter 40 is incremented by pulses on the COUNT UP line and decremented by pulses on the COUNT DOWN line. These two signals are formed by gates 56.5, 56.6, 54.3, 54.4, and 52.3 from the STEP IN and DIR (direction) signals supplied by the controller 16 to the disk drive and conditioned by gate 52.3 which allows counting of pulses for the selected disk drive only.

At power-on, or after the user-select settings are changed, the microprocessor 34 preloads a number into the counter 40. This is done by writing the data to the appropriate counter's data inputs, which are connected to data output lines of the microprocessor, and pulsing the counter's LOAD input. By setting an appropriate count, the high-order bit of the most significant counter, 40.3, which forms the WRITE ENABLE signal, can be made to go high or low at any given cylinder, thus allowing a variable sized section of the disk starting at either the beginning or end of the drive to be write-protected.

Read Protection

The device also has the ability to protect a disk against all access. A user could thus protect sensitive information on the disk from being read by third parties.

When the READ ENABLE signal, which is output from the microprocessor 34, is high, step pulses from the controller 16 are prevented from going to the disk drive 14. Gates 52.2, 54.2 and 56.2 serve to hold off these step pulses when READ ENABLE is high, thereby preventing the drive stepping and preventing reading of any data other than that on the last selected cylinder.

The TRACK Ø line going to the disk drive 14 is fed to a data input line of the microprocessor 34, after being conditioned by gate 52.4, so that it is enabled only by the disk drive selected by switch 50. This line is periodically sampled by the microprocessor to determine if the disk drive heads are at track zero (which they are at power-on or at other times during operation). The first time the TRACK Ø goes active after power-on, the counters are loaded with the data that will cause them to enable or disable writing to the disk (via WRITE ENABLE). The counters are only loaded when TRACK Ø is active, so that they synchronise with the disk drive's internal track count.

I claim:

1. A method of securing a computer against unauthorized accessing of a predetermined set of the storage domains, where said computer comprises a mass storage device which includes:
   a data storage medium divided into a series of storage domains, and a read-write head for read-write accessing of the data storage medium;
   control means for controlling the mass storage device; and
   a bus connecting the control means to the mass storage device, which bus includes a stepping line to which stepping signals are applied by the control means for stepping the read-write head from one storage domain to the next, and a direction control line to which direction control signals are applied by the control means for controlling the direction in which the read-write head is stepped,
   which method comprises, in counting means connected to the stepping line and the direction control line between the control means and the mass storage device, and in response to the stepping signals and direction control signals, keeping a count corresponding to the position of the read-write head relative to the data storage medium, and in response to the count in the counting means, inhibiting access to said predetermined set of storage domains.

2. A method according to claim 1, wherein access to said predetermined set of storage domains is inhibited by inhibiting write operations by the read-write head to the data storage medium when the count in the counting means corresponds to a position of the read-write head within said predetermined set of storage domains.

3. A method according to claim 1, wherein access to said predetermined set of storage domains is inhibited by inhibiting the stepping signals from stepping the read-write head to a storage domain within the predetermined set of storage domains.

4. A method according to claim 1, wherein the mass storage device is a disk drive having a plurality of tracks, each track constituting one of said storage domains.

5. For use with a computer comprising: a mass storage device which includes a data storage medium divided into a series of storage domains, and a read-write head for read-write accessing of the data storage medium; control means for controlling the mass storage device; and a bus connecting the control means to the mass storage device, which bus includes a stepping line to which stepping signals are applied by the control means for stepping the read-write head from one storage domain to the next, and a direction control line to which direction control signals are applied by the control means for controlling the direction in which the read-write head is stepped; an accessory device for securing the computer against unauthorized accessing of a predetermined set of the storage domains, the accessory device comprising:
   a bus connection for insertion in the bus between the control means and the mass storage device and including a stepping line connection for insertion in the stepping line and a direction control line connection for insertion in the direction control line;
   counting means connected to the stepping line connection and the direction control line connection, which is operative in response to the stepping signals and direction control signals to keep a count corresponding to the position of the read-write head relative to the data storage medium; and
   gate means for inhibiting access to said predetermined set of storage domains in response to the count in the counting means.

6. An accessory device according to claim 5, wherein the bus connection comprises a write gate line connection for insertion in a write gate line forming part of the bus, and wherein the gate means comprises a gate (54.1) in the write gate line connection, for gating a write enable signal from the control means to the mass storage means in response to the count on the counting means corresponding to a position of the read-write head within said predetermined set of storage domains.

7. An accessory device according to claim 5, wherein the gate means comprises a gate (54.2) in the step line connection, for gating the stepping signal from the control means to the mass storage means in response to the count on the counting means corresponding to a position of the read-write head in a storage domain adjacent said predetermined set of storage domains.

8. An accessory device according to claim 5, for a computer which comprises first and second complementary plug connectors in said bus for disconnectably connecting the control device to the mass storage device, the accessory device comprising a third plug connector connected to one end of the bus connection and a fourth plug connector connected to the other end of the bus connection, the third and fourth plug connectors being complementary to the first and second plug connectors so that the accessory device is disconnectably insertable in the bus.

* * * * *